July 28, 1931. W. SPIEKERMANN 1,816,407
TAKE-OFF AND LEERING CONVEYER FOR SHEET GLASS FORMING MACHINES
Filed March 30, 1929
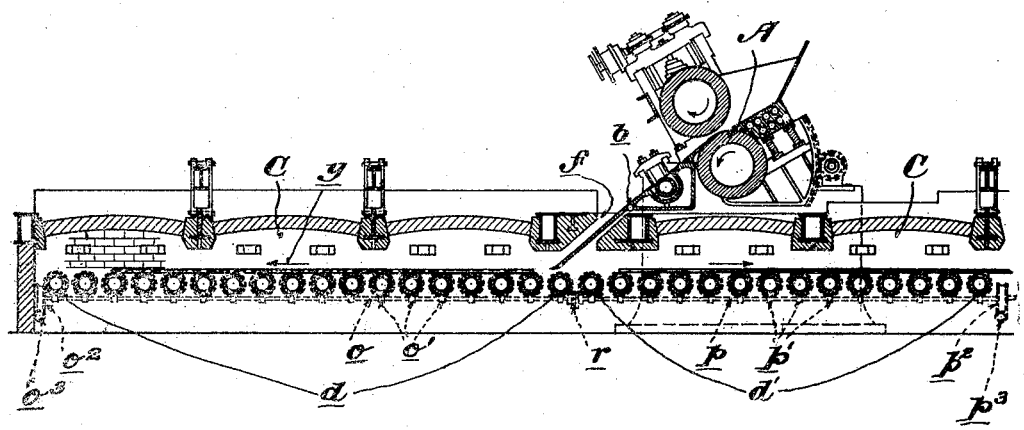
INVENTOR
Wilhelm Spiekermann
BY
ATTORNEYS.

Patented July 28, 1931

1,816,407

UNITED STATES PATENT OFFICE

WILHELM SPIEKERMANN, OF HERZOGENRATH, GERMANY, ASSIGNOR, BY MESNE ASSIGNMENTS, TO THE AMERICAN BICHEROUX COMPANY, A CORPORATION OF DELAWARE

TAKE-OFF AND LEERING CONVEYER FOR SHEET GLASS FORMING MACHINES

Application filed March 30, 1929, Serial No. 351,381, and in Germany April 7, 1928.

This invention has for its object to provide a new and improved method of delivering sheet glass as formed on an intermittent forming machine to a leer for annealing. Previous processes having this in view have generally required that the sheet move forward to and through the leer in the same direction in which it was moving when formed, but at a slower speed than the speed at which it was formed. I propose in lieu of the above the feeding of the sheet during leering in a direction opposite to which it was moved during its removal from the forming machine, and I preferably accomplish this by placing the forming machine above the leer, so that it delivers the glass downwardly onto a reversible take-off bed, which is in alignment with the conveyer bed in the leer.

Referring to the accompanying drawings in which corresponding parts are designated by corresponding marks of reference, and which is a vertical section through an apparatus embodying this invention and capable of being used in carrying out the method herein described, A is a suitable forming machine of the intermittent type, but not necessarily such as disclosed in United States Patent No. 1,673,098 of June 12th, 1928.

Sheet glass formed therein is delivered down the apron $b$ onto a take-off mechanism shown as consisting of a series of rollers $d$, which by means of a drive shaft $o$ may be driven through the worm gears $o'$ in such a direction that the glass resting thereon will be moved away at substantially the same rate that the glass is formed, or when the glass is completely formed and at the will of the operator the direction of rotation of the rollers $d$ may be reversed.

The receiving take-off mechanism formed by the rollers $d$ is in operative alignment with the leer conveyer, likewise preferably consisting of a series of rollers $d'$, which latter are driven at a peripheral speed suitable for the feeding of the sheet through the leer. The drive mechanism for the initial receiving rollers $d$ comprises the drive shaft $o$ with the worm gears $o'$, all driven through the ring and pinion $o^2$ and $o^3$. The rollers $d'$ forming the leer conveyer are driven by the shaft $p$ through the worm gears $p'$, all of which are driven by the ring and pinion $p^2$ and $p^3$ from a source of power. Between the shafts $o$ and $p$ is the electro-magnetic clutch $r$ adapted, when closed, to drive the rollers $d$ and $d'$ in the same direction and at the same peripheral speed.

When the sheet of glass is received on the rollers $d$ the said rollers are rotating in a direction away from the forming machine at a speed equal to or slightly greater than the speed of sheet formation. The rollers $d$ at this time are driven through the shaft $o$ while the rollers $d'$ of the leer are rotating in reverse direction at an annealing speed. After the sheet of glass has been received entirely on the rollers $d$ forming the receiving section, and has become sufficiently cooled the rotation of these rollers is stopped by disengaging the source of power from the pinion $o^3$. The electro-magnetic clutch $r$ is then thrown, connecting the shafts $o$ and $p$ and the rollers $d$ carrying the newly-formed sheet of glass, rotate in the opposite direction at the same speed and in the same direction as the rollers $d'$ of the leer. As soon as the sheet of glass has passed off the rollers $d$ of the take-off and onto the rollers $d'$ of the leer, the direction and speed of rotation of the rollers $d$ may again be reversed by disengaging the electromagnetic clutch $r$ and by connecting the source of power to the pinion $o^3$. The rollers $d$ are then rotating in a proper manner to receive another newly formed sheet of glass. The sheet of glass which has just passed away from the rollers $d$ is conveyed through the leer on the rollers $d'$ at leering speed.

The take-off mechanism and the leer conveyer may be enclosed in a suitable structure $c$ provided with means for controlling the temperature therein at desired points as is well known. The roof of this structure $c$ should have an opening $f$ therein to permit the passage therethrough of the apron $b$, the lower edge of which is slightly above the level of the take-off rollers $d$, while the forming machine A is located above the leer.

Having thus described my invention what I claim is:

1. The hereinbefore described method of handling glass sheets delivered by an intermittent forming machine, which comprises delivering the same downward upon a conveyer whereby they are moved away from the forming machine, and then reversing the feed of the sheet to cause it to pass under the forming machine.

2. The combination with an intermittent sheet glass forming machine, of a take-off bed comprising a series of rollers adapted to receive the sheets as formed, means for reversing the direction of rotation of the rollers and the feed of the sheet thereon, and a leer conveyer below the forming machine and in operative alignment with the take-off bed.

3. The combination with a take-off bed, comprising a series of rollers and means for reversing the direction of rotation thereof and the feed of a sheet of glass carried thereby, of a leer conveyer in operative alignment with the take-off bed, and a forming machine having its delivery apron above the level of the take-off bed at a point near the forward end of the conveyer.

4. The combination with a leer conveyer, of an intermittent forming machine located above a portion thereof and a take-off mechanism receiving glass from the forming mechanism having reversible feed, and in operative alignment with the conveyer.

In testimony whereof I hereunto affix my signature.

WILHELM SPIEKERMANN.